United States Patent [19]

Minami

[11] Patent Number: 4,679,977
[45] Date of Patent: Jul. 14, 1987

[54] AUTOMATIC GUIDED VEHICLE
[75] Inventor: Hideaki Minami, Osaka, Japan
[73] Assignee: Tsubakimoto Chain Co., Japan
[21] Appl. No.: 794,647
[22] Filed: Nov. 4, 1985
[51] Int. Cl.$^4$ .............................................. B60P 1/52
[52] U.S. Cl. .................... 414/533; 198/574
[58] Field of Search ............... 414/353, 518, 523, 529, 414/532-534; 198/376, 574

[56] References Cited
U.S. PATENT DOCUMENTS

| | | | |
|---|---|---|---|
| 3,561,625 | 2/1971 | Dioguardi et al. | 414/533 |
| 3,675,798 | 7/1972 | Carder et al. | 414/533 |
| 3,679,075 | 7/1972 | Guyaux et al. | 414/533 |
| 4,055,245 | 10/1977 | Sundberg | 198/574 X |
| 4,349,097 | 9/1982 | Curti | 198/574 X |

Primary Examiner—Joseph E. Valenza
Assistant Examiner—David A. Bucci
Attorney, Agent, or Firm—Darby & Darby

[57] ABSTRACT

This invention relates to an automatic guided vehicle for automatically conveying parts, half-finished products and products in a factory or a warehouse. The automatic guided vehicle is provided with a horizontally turnable loading table above a travelling truck, and constructed so that a pair of right and left driving wheels of the travelling truck are rotated reversely to each other so that the travelling truck whirls to steer and a rotating force of a motor for rotating one driving wheel is transmitted to the loading table to thereby turn the loading table reversely relative to the whirling direction of the travelling truck by an equal amount of whirling of the travelling truck, whereby even when the travelling truck whirls, the loading table does not change its orientation with respect to a floor or stations. Accordingly, when the station is located sidewise of a travelling way, or when the same is located at the end of a branch extending perpendicularly to the travelling way, there is no need of whirling the automatic guided vehicle for loading on or unloading from the goods to be conveyed.

5 Claims, 7 Drawing Figures

AUTOMATIC GUIDED VEHICLE

BACKGROUND OF THE INVENTION

1. Field of the Invention

This invention relates to an automatic guided vehicle for conveying, for example, parts and products on the way of manufacturing on the production line in a factory, or storing into or shipping from an automatic warehouse products or half-finished products on the way of manufacturing, and more particularly to an automatic guided vehicle which is adapted to keep a loading table provided thereon not-changed in the relative direction to a floor even when the vehicle is whirled to enter an assorting line or the like branched perpendicularly to a main travelling way.

2. Description of the Prior Art

Recently, the so-called factory automation has been progressed so that the automatic guided vehicle is often used to convey an object to be conveyed, such as a part, half-finished products, or products, in the factory, in the warehouse attached thereto, or between both.

FIG. 1-(a) is a schematic plan view of such automatic guide system, in which an automatic guided vehicle 4 in use, when moving forwardly in the direction of the unshaded arrow as shown n FIG. 1-(a) is usually provided at the upper portion with roller conveyor 4a which is capable of conveying the object 5 perpendicularly to the forward direction, in other words, sidewise of a main travelling way 1.

While, a station 30 where the object 5 to be conveyed is loaded on the automatic guided vehicle 4 or unloaded therefrom, for the so-called loading-unloading operation, is located on a point A halfway and sidewise of the main travelling way 1. Hence, the object 5 is unloaded to the station 30 from the automatic guided vehicle 4 or loaded to the automatic guided vehicle 4 from the station 30 by driving the roller conveyor 4a when the automatic guided vehicle 4 stops at the point A of the main travelling way 1.

The main travelling way 1 and many other stations, however, may not have the relation therebetween such that the station is located sidewise of the travelling way as at the point A showing in FIG. 1-(a), in other words, perpendicular to the forward direction of the automatic guided vehicle 4, but sometimes may have the relation in tha the automatic guided vehicle 4 is positioned at a point C with respect to the station 31 as shown in FIG. 1-(b), because of various conditions of route setting. In detail, the station 31 is located on the extension of the end of a branch 2 extending perpendicularly from the straight main travelling way 1.

In this case, operation as shown in FIG. 1-(b) is required to unload the object 5 from the automatic guided vehicle 4 to the station 31. In detail, the automatic guided vehicle 4 at first is moved forwardly on the main travelling way 1 from the point A toward a branch point B to the branch 2. Next, the vehicle 4 is whirled clockwise at an angle of 90° and then enters the branch 2 to move toward a point C just before the station 31 which is located at the end of the extension of branch 2. While, the conveying direction of the object 5 by the roller conveyor 4a orients transversely of the branch 2, that is, perpendicularly to the extension thereof. Therefore, it is impossible to transfer the object 5 to the station 31. Hence, it is necessary for unloading the object 5 onto the station 31 to orient the roller conveyor 4a loading the object 5 toward the station 31, concretely, to whirl the body of the automatic guided vehicle 4 at an angle of 90° just before the station 31.

In order to solve such problem, for example, the following construction is proposed to the automatic guided vehicle 4. In other words, driving wheels for travelling the automatic guided vehicle 4 are made turnable at an angle of 90° (where driven wheels employ casters or the like) so that the automatic guided vehicle 4 is provided with function to travel transversely, that is, perpendicularly to the normal forward direction. The automatic guided vehicle 4 having such function, when it travels from the point A to that B on the main travelling way 1 as shown in FIG. 1-(c), turns the driving wheels each at an angle of 90° with respect to the previous forward direction, in other words, in parallel to the branch 2 and then travels thereon. Hence, the conveying direction of the conveyor 4a coincides with the direction toward the station 31, thereby enabling the object 5 to be transferred from the automatic guided vehicle 4 to the station 31.

The conventional automatic guided vehicle, which is desired to be simple in construction, does not adopt a steering mechanism for changing each driving wheel in its direction, but allows a pair of right and left driving wheels to be rotationally driven independently of each other, thereby turning through different rotational speed of each driving wheel, or allows the driving wheels to rotate reversely to each other and at the same speeds, thereby changing the forward direction of the vehicle at one place. Hence, it is necessary for making the automatic guided vehicle travelable transversely as above-mentioned to construct the plurality of driving wheels each to be changeable of its direction. Accordingly, each driving wheel requires its steering mechanism in comparison with the conventional construction, thereby occurring problems in that control means for the steering mechanism is required and the automatic guided vehicle is complicated in construction.

OBJECT OF THE INVENTION

In the light of the above problem, the present invention has been designed.

A first object of the invention is to provide an automatic guided vehicle easy to load an object from or unload an object onto a station located sidewise of a travelling way for the automatic guided vehicle and also from or onto a station located on an extension of an end of a branch extending perpendicularly from the main travelling way.

A second object of the invention is to provide an automatic guided vehicle, which, when whirled to change the forward direction, automatically keeps a loading table not-changed in the direction as before the whirling with respect to a floor or the like.

A third object of the invention is to provide an automatic guided vehicle simple in construction, lightweight, and reducible as much as possible of the occurrence of a failure, thereby attaining the above objects.

The above and further objects and features of the invention will more fully be apparent from the following detailed description with reference to accompanying drawings.

DETAILED DESCRIPTION OF THE INVENTION

Next, an embodiment of the automatic guided vehicle of the present invention will be described by reference to the drawings.

Figure 2:
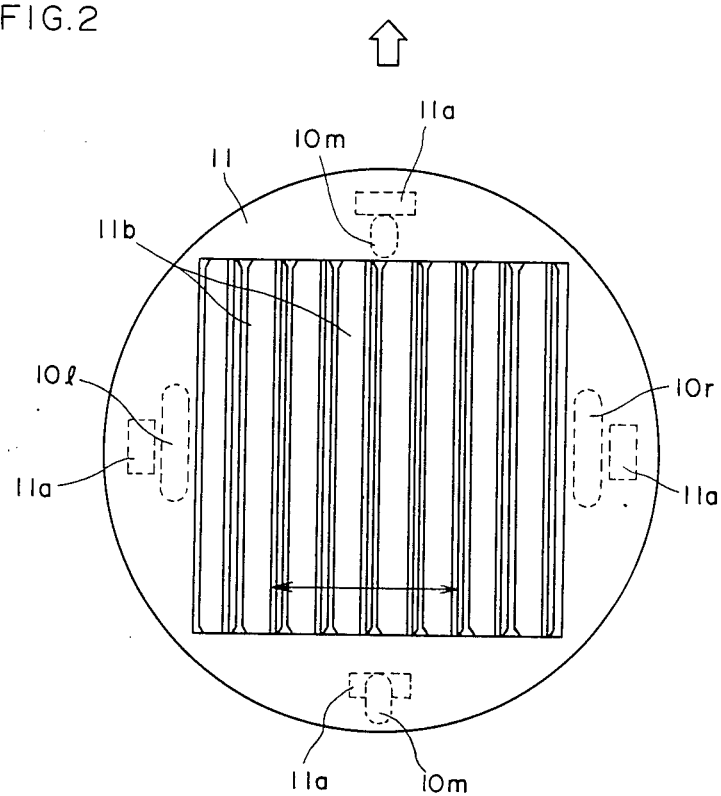
FIG. 2 is a schematic plan view of an embodiment of an automatic guided vehicle of the invention.
Figure 3:
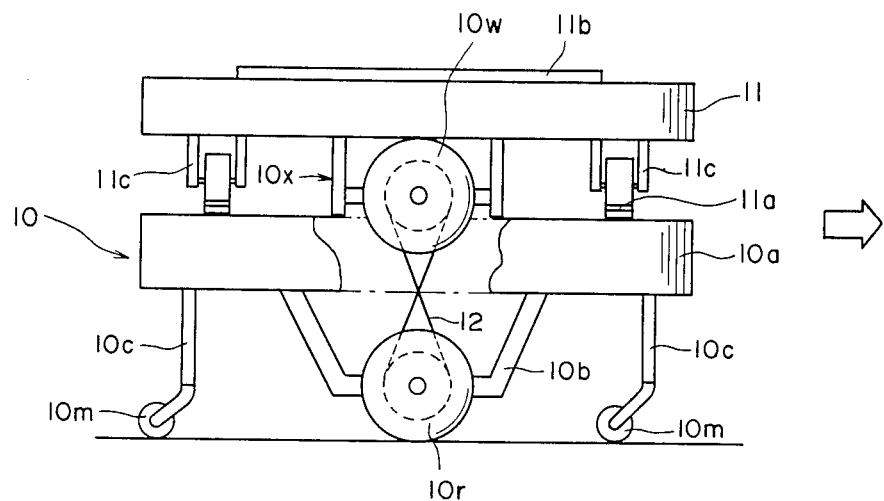
FIG. 3 is a partially cutaway side view thereof.
Figure 4:
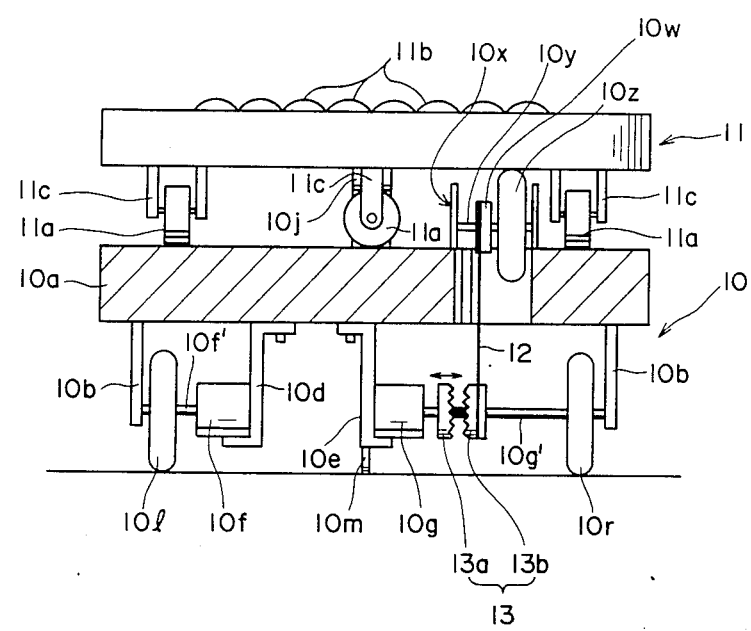
FIG. 4 is a partially cutaway elevation of the same.

FIGS. 2 through 4 are a plan view of the automatic guided vehicle of the invention, a partially cutaway side view thereof when viewed from the right hand (in FIG. 2) in the forward direction, and a partially cutaway elevation of the same when viewed from the rear (the lower side in FIG. 2), in which reference numeral 10 designates a travelling truck, and 11 designates a loading table provided above the travelling truck 10 and horizontally turnable, an object to be conveyed being loaded thereon.

The travelling truck 10 comprises a disc-like frame 10a, wheel shaft support members 10b, 10b mounted on the lower surface of the frame 10a and positioned near the outer periphery thereof and laterally suymmetrical with respect to the center of the frame 10a, motor mounting members 10d and 10e mounted to the frame 10a and opposite to the wheel shaft support members 10b, 10b respectively, and driving wheels 10l and 10r mounted between the left side wheel shaft support member 10b and the motor mounting member 10d, and the right side wheel shaft support member 10b and the motor mounting member 10e.

Caster mounting legs 10c, 10c are mounted on the lower surface of the frame 10a and positioned longitudinally symmetrically with respect to the center, and carry at the lower ends casters 10m 10m, in relation of freely whirling respectively.

The driving wheels 10l and 10r connect with output shafts 10f' and 10g' of driving motors 10f and 10g mounted to the motor mounting members 10d and 10e at the lower surface of the frame 10a, thereby being driven independently of each other by the driving motors 10f and 10g respectively. Hence, both the driving wheels 10l and 10r are driven at different rotational speeds to enable the automatic guided vehicle of the invention to travel in a curved line, and rotate reversely to each other at the same speeds at one position to enable the automatic guided vehicle to whirl thereat.

Also, the output shaft 10g' of the driving motor 10g is provided with a clutch mechanism 13 comprising a driving disc 13a and a driven disc 13b engageable or disengageable therewith or therefrom, the driving disc 13a being spline-connected with the output shaft 10g' to be slidable therealong (laterally of the frame 10a). The clutch mechanism 13 is provided with operating means (not shown), so that the operating means is biased to slide and the driving disc 13a along the output shaft 10g' of driving motor 10g toward the driven disc 13b and engage the driving disc 13a therewith. While, the driven disc 13b is freely fitted onto the output shaft 10g' at a predetermined axial position in a manner of idling.

Accordingly, the driven disc 13b, when in engagement with the driving disc 13a, rotates in association with the output shaft 10g' of the driving motor 10g and when in disengagement from the same, idles regardless of rotation of the output shaft 10g' of the driving motor 10g. In addition, a groove for a belt 12 to be discussed below is formed at the outer periphery of the driven disc 13b.

The loading table 11 is identical in the size and form in plane view with the frame 10a, disposed concentrically therewith, and horizontally turnable with respect to the frame 10a around a rotary shaft 10j erected thereon. Rollers 11a, are mounted rotatably on the lower surface of the loading table 11 and disposed at the positions where the circumference of the loading table 11 are divided equally into four, and roll on the upper surface of the frame 10a, thereby supporting thereon the loading table 11.

Incidentally, on the upper surface of the loading table 11 are provided roller conveyor 11b which can, as the same as the conventional automatic guided vehicle of this kind, convey the object to be conveyed in both the perpendicular directions to the normal forward direction of the automatic guided vehicle, in other words, toward both lateral sides of the surface upon which the automatic guided vehicle normally travels.

A bore of moderate size is formed through at a portion of the surface of the frame 10a facing the driven disc 13b. Roller support members 10x are erected at the upper peripheral edge of the bore, the roller support members 10x carrying therebetween a driving roller 10z which is formed of material, such as rubber, large in a frictional force and is rotatable through a rotary shaft 10y extending radially of the loading table 11 (in other words, the plane of rotation of the driving roller 10z is parallel to the tangent of the loading table 11). Also, the driving roller 10z abuts at the outer periphery thereof against the lower surface of the loading table 11, and at the rotary shaft 10y of the same is fixed a driven pulley 10w having a groove for the belt 12, the belt 12 being stretched crosswise across the grooves therefor at the driven pulley 10w and driven disc 13b through the bore at the frame 10a.

Hence, when the clutch mechanism 13 connects to engage the driving disc 13a with the driven disc 13b, the latter rotates through the driving motor 10g so that the driving roller 10z rotates reversely to the driven disc 13b (or the right side driving wheel 10r) to thereby turn the loading table 11.

Incidentally, when the driving wheels 10l and 10r are driven to rotate reversely to each other and at equal speeds, the travelling truck 10 does not travel but whirls at the same point. In this case, when the driving wheels 10l and 10r, driving roller 10z, driven disc 13b and driven pulley 10w are defined in the size respectively so that an amount of whirling (an angle of whirling) of the travelling truck 10 caused by rotations of driving wheels 10l and 10r is equal to an amount of relative turn (an angle of turn) of the loading table 11 to the travelling truck 10 caused by rotation of driving roller 10z when the clutch mechanism 13 engages, the loading table 11 does not turn relative to the floor.

In addition, the frame 10a and loading table 11 are not limited in a round shape as in the embodiment of the invention.

Figure 1A:
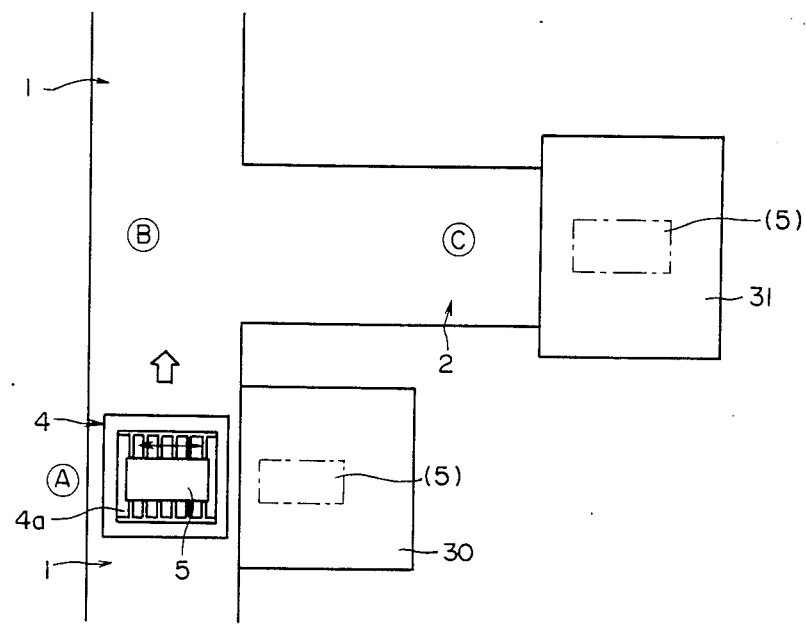
FIGS. 1-(a), -(b) and -(c) are illustrations for travelling and loading-unloading operation of an automatic guided vehicle used for the conventional automatic guide system.
Figure 1B:
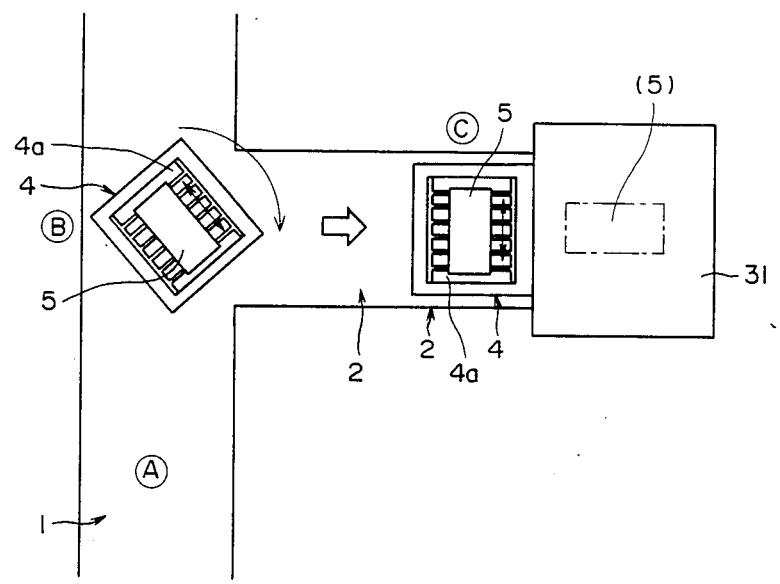
Figure 1C:
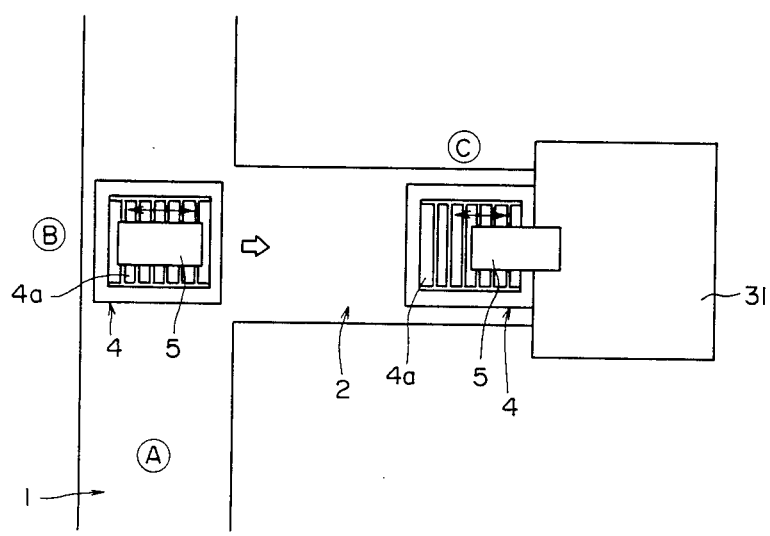

Next, referring to FIG. 5, explanation will be given on travelling and loading-unloading operation of the automatic guided vehicle of the invention when travelling on the same way as shown in FIGS. 1-(a), -(b) and -(c).

Figure 5:
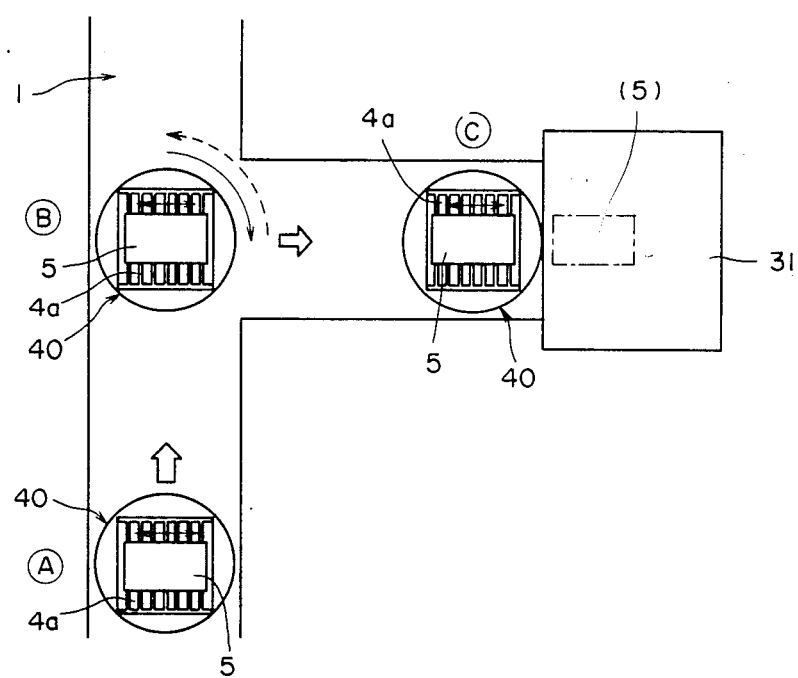
FIG. 5 is an illustration of travelling and loading-unloading operation of the automatic guided vehicle of the invention.

The automatic guided vehicle 40 of the invention drives by the driving motors 10g and 10f a pair of right and left driving wheels 10l and 10r to rotate at equal speed and in the same direction and travels straight from the point A to the branch point B in FIG. 5 while being supported by the casters 10m, 10m provided at both the longitudinal sides of the travelling truck 10 and the driving wheels 10l and 10r.

In addition, the clutch mechanism 13 of the automatic guided vehicle 40 of the invention, when in the normal travel, is cut off, in other words, disengages the driven disc 13b from the driving disc 13a and the direction of conveying the object 5 by the roller conveyor 11b is usually perpendicular to the forward direction of the automatic guided vehicle 40, in other words, toward both the sides of the travelling way 1.

Next, when the automatic guided vehicle 40 reaches the branch point B, one motor 10g for the driving wheel 10r with the clutch mechanism 13 is rotated reversely to the previous rotational direction and at equal speed to the other driving motor 10f. Hence, the driving wheel 10r rotates reversely, so that the travelling truck 10, as shown by the solid arrow, whirls clockwise at an angle of 90°, whereby the automatic guided vehicle 40 can move straight and directly toward the station 31 at the end of the branch 2.

When the travelling truck 10 whirls clockwise as foregoing, the driving disc 13a engages with the driven disc 13b simultaneously with the reverse rotation of the driving motor 10g. Hence, a driving force of the driving motor 10g rotates the driving roller 10z through the driving disc 13a, driven disc 13b and belt 12, thereby turning the loading table 11 counterclockwise at an angle of 90° as shown by the broken line arrow in FIG. 5. In other words, in a case where the travelling truck 10 whirls clockwise as above-mentioned, the loading table 11 turns counterclockwise with respect to the travelling truck 10, at which time the loading table 11 turns reversely to the travelling truck 10 in an equal amount of turn thereto because the driving wheels 10e and 10r, driving roller 10z, driven disc 13b and driven pulley 10w are so defined in the size that an amount of turn (an angle of turn) of the loading table 11 is equal to that of whirling of the travelling truck 10, which results in that the loading table 11 does not turn relative to the floor (or the main travelling way 1 or the station 31). In other words, the roller conveyor 11b at the automatic guided vehicle 40 are kept in the conveying direction thereof as the same as before the whirling at the point B, for eample, when positioned at the point A.

After the travelling truck 10 whirls at the branch point B toward the branch 2, the driving disc 13a again disengages from the driven disc 13b at the clutch mechanism 13 and the driving wheels 10l and 10r are driven to rotate in the same directions and at equal speed. Thus, the travelling truck 10, in other words the automatic guided vehicle 40 of the invention travels straight on the branch 2 toward the station 31.

Then, the automatic guided vehicle 40 reaches the point C just before the station 31, at which time the conveying direction of the roller conveyor 11b coincides with the direction toward the station 31 because the amount of relative turn of the loading table 11 to the floor or the station 31 is zero when the automatic guided vehicle 40 whirls at the branch point B. Hence, after the vehicle 40 stops at the point C, the rolelr conveyor 11b is driven, whereby the object 5 loaded thereon can be unloaded to the station 31 without the need to change the direction of the loading table 11.

After the object 5 is unloaded to the station 31, the automatic guided vehicle 40 is operated reversely to the above and leaves the station 31 to return to the predetermined main travelling way 1 and travels thereon as before.

Alternatively, in the above-mentioned embodiment, the driving roller 10z at the loading table 11 may be substituted by a gear or by a crown gear provided at the lower surface of the loading table 11.

As seen from the above, in the present invention, since the loading table 11 keeps its orientation unchanged with respect to the floor or the station 31 even when the travelling truck 10 whirls, the object to be conveyed can be transferred to the station at the lateral side of the main travelling way 1, or to the station located at the extension of the end of the branch 2 perpendicular to the main travelling way 1, without the need to change the travelling direction of the automatic guided vehicle 40 as a whole.

Also, there is no need of the apparatus, such as a driving motor, for changing the direction of the driving wheel as conventional, whereby the automatic guided vehicle of the invention is inexpensive to assemble, makes the truck lightweight, and does not whirl the truck by individually changing a plurality of driving wheels in the direction as conventional one, but drives only one pair of driving wheels, thereby maintaining a stable travelling performance due too the constant distance (tread, wheelbase) between the wheels. Furthermore, the relation of position and angle between the driving wheels is not changed to each other, whereby adjustment and control for the direction of each wheel are not required, thereby obtaining high reliability.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within meets and bounds of the claims, or equivalence of such meets and bounds thereof are therefore intended to be embraced by the claims.

What is claimed is:

1. An automatic guided vehicle comprising
    a travelling truck being provided with power sources, driving wheels driven by said power sources respectively, said power sources selectively driving said driving wheels at different speeds for steering,
    a loading table for loading an object to be conveyed, being provided above said travelling truck and capable of horizontal turn about a vertical axis, and
    a turning means for said loading table, which selectively turns said loading table relative to said travelling truck,
    said turning means for said loading table makes said loading table turn in the reverse direction with respect to said trvelling truck and at an amount equal to the whirling amount of said travelling truck when said travelling truck whirls for steering.

2. An automatic guided vehicle as set forth in claim 1, wherein said power sources for steering are constructed to rotate a pair of right and left driving wheels in the reverse direction to each other and at equal rotational speed respectively.

3. An automatic guided vehicle as set forth in claim 2, wherein said turning means for said loading table is driven by said power source for one of said pair of driving wheels.

4. An automatic guided vehicle as set forth in claim 3, wherein a clutch means is interposed between said turning means for said loading table and said power source for said one of driving wheels so that when said travelling truck whirls, said clutch means engages to turn said loading table.

5. An automatic guided vehicle as set forth in claim 1, wherein said power sources are electric motors respectively.

* * * * *